3,682,857
COMPOSITIONS CONTAINING VINYL
CHLORIDE POLYMERS
David Neil Harris, Geoffrey Markham Hood, and Alan Sheller, Welwyn Garden City, England, assignors to Imperial Chemical Industries Limited, London, England
No Drawing. Filed Apr. 10, 1969, Ser. No. 815,178
Claims priority, application Great Britain, Apr. 19, 1968, 18,672/68
Int. Cl. C08f 29/24
U.S. Cl. 260—33.8 UA
17 Claims

ABSTRACT OF THE DISCLOSURE

Blends of vinyl chloride polymers and other polymers are prepared by coagulating a latex of the other polymer in the presence of a vinyl chloride polymer slurry. An organic liquid, particularly vinyl chloride, is present before filtration of the slurry in order to effect adhesion of the modifier polymer onto the vinyl chloride polymer.

---

This invention relates to the production of compositions containing vinyl chloride polymers.

The most widely used vinyl chloride polymers are those known as granular vinyl chloride polymers. These polymers have properties that render them eminently suitable for a wide variety of applications but for some uses it is desirable to modify the properties of granular vinyl chloride polymers by blending them with various other polymer materials, particularly resinous polymers, such as styrene/acrylonitrile copolymers or methyl methacrylate polymers and copolymers, which improve the ease of processing of the vinyl chloride polymers, and rubbery polymeric materials, such as butadiene copolymers, ethylene copolymers, polyacrylates and chlorinated polythene, which improve the resistance of the granular vinyl chloride polymers to impact.

Conventional methods of mixing the modifying polymer with the vinyl chloride polymer that are generally practised include blending the polymeric materials together at an elevated temperature in a mixing apparatus such as a Banbury mixer or on a two roll mill. Also the polymeric materials have been mixed in powder form and then subjected to elevated temperatures, for example, on a two roll mill, to obtain a homogeneous mixture.

Such mixing processes are undesirable since a long mixing time is necessary in order to obtain a good dispersion of the modifier in the vinyl chloride polymer.

In addition it is necessary, in such a process, to use a polymeric modifier in the form of a dry solid.

Many of the polymeric modifiers are made by an aqueous emulsion polymerisation process to give an aqueous latex containing the particles of the polymeric modifier and so, before they can be incorporated into a vinyl chloride polymer by the methods outlined above, the polymeric modifier particles have to be separated from the aqueous latex and dried. This is a disadvantage in that the separation and drying step adds to the cost of the polymeric modifier.

Thus it is desirable to devise a process wherein a good dispersion of a modifier in latex form in a vinyl chloride polymer can be obtained.

Granular vinyl chloride polymers are produced by a suspension polymerisation process wherein vinyl chloride, together with any comonomers, is polymerised, with the aid of a free radical yielding initiator, while suspended in an aqueous medium in the form of small globules or droplets. The product of this polymerisation process is a slurry of the polymer particles in the aqueous medium. The polymer is generally separated from the aqueous medium, when operating on a large scale, by filtering or centrifuging and then drying the polymer particles.

It would therefore be desirable to incorporate the polymeric modifier, in the form of a latex, before this separation process so that the aqueous medium from both the vinyl chloride polymerisation process and the latex of the polymeric modifier can be removed at the same time.

If, however, the latex of the polymeric modifier is merely added to the slurry of the vinyl chloride polymer and the mixture filtered and dried, the major proportion of the particles of the polymeric modifier are not retained with the vinyl chloride polymer particles. The reason for this is that the average particle size of a latex made by an aqueous emulsion polymerisation process is generally very small and so the particles of the polymeric modifier are washed away from the mixture during the filtering or centrifuging process. While the problems of loss of polymeric modifier could be avoided by omitting the filtration step and drying the slurry directly by, for example, slurry spray drying, such processes are less economical and also there is a tendency for undesirable contamination of the product with materials such as emulsifier residues from the latex, which might adversely affect properties of the blend. Consequently, a filtration or centrifuging process wherein the bulk of the aqueous medium is relatively rapidly and cheaply removed is to be preferred. With such a process, the danger of contamination is lessened since water soluble materials such as emulsifier residues may be partly removed with the aqueous phase and may further be removed from the polymer blend by washing.

The problem of loss of polymeric modifier can partially be overcome by coagulating the latex of the polymeric modifier, for example, by the addition of an electrolyte, in the presence of the slurry of the vinyl chloride polymer. We have found that even if this is done, with some polymeric modifiers a substantial proportion of the polymeric modifier is not retained with the vinyl chloride polymer particles, especially where the slurry is sheared, for example by stirring or pumping from one vessel to another, or in the centrifuge where the latter is used to effect separation from the aqueous phase. For reasons of economy it is desirable that not more than 25% by weight of the polymeric modifier should be lost.

We have now devised a process which involves the addition of the latex of certain polymeric modifiers to the vinyl chloride polymer slurry coagulation of the latex, and the agitation of the coagulum so produced in the presence of an organic liquid, which is preferably monomeric vinyl chloride, before effecting separation of the polymer from the aqueous medium.

Thus in one embodiment of our invention, a latex of a polymeric modifier is added to the polymerisation vessel and coagulated therein after the desired conversion of monomeric vinyl chloride to polymer has been achieved and while unreacted monomeric vinyl chloride is still present in the polymerisation vessel.

Various proposals have been made previously of introducing polymeric materials into the polymerisation vessel before or during polymerisation. Where, however, the polymeric material has been introduced in the form of a latex it has been found that, in general, the latex interferes with the course of the polymerisation, for example, by causing large deposits of polymer termed "build up" to be formed on the vessel walls or by undesirably modifying the particle size of the vinyl chloride polymer. In the latter respect we have found that an undesirably coarse polymer is produced—i.e. a polymer having a particle size distribution such that more than 1% by weight of the polymer will be retained on a 52 mesh sieve (British Standard Fine Sieve Series), possibly because the large surface area of the latex particles absorbs most of the dispersing or granulating agent normally added to stabilise the suspension of the vinyl chloride droplets in the aqueous medium and to control the particle size of the vinyl chloride polymer. A further disadvantage with this type of process is that often thick slurries are formed, which are difficult to stir.

Also, some polymeric modifiers, particularly those containing residual unsaturation such as butadiene rubbers, severely retard the polymerisation reaction causing excessive reaction times. One proposal dealing with the problems of build up when polymeric materials are added in latex form is to be found in our United Kingdom patent specification No. 1,069,848 wherein an electrolyte is added to the aqueous medium and this enables the amount of build up to be kept to an acceptable level. However, even by the use of this process, thick slurries may still be produced. In addition, if the latex of the modifier is added at the start of polymerisation, useful space in the polymerisation vessel is taken up. During the polymerisation reaction a contraction in volume of the vessel contents occurs and so, at the end of the reaction there is adequate room for the addition of the latex without having to reduce the size of the initial charge to the polymerisation vessel. Hence, more efficient utilisation of the polymerisation capacity can be achieved if the latex can be added at the end of polymerisation.

In our process, because the vinyl chloride polymer particles are already formed as in a conventional suspension polymerisation process before the introduction of the polymeric modifier, the latex addition and its subsequent coagulation does not substantially affect the particle size of the vinyl chloride polymer particles.

Therefore, according to our invention we provide a process for the manufacture of blends of a vinyl chloride polymer and a polymeric modifier containing less than 40% by weight of units derived from butadiene in which a monomeric material comprising vinyl chloride or a mixture of vinyl chloride and a minor amount of one or more copolymerisable monomers is polymerised in aqueous suspension in a reaction vessel and, after the desired conversion of monomeric material to polymer has been achieved, an aqueous latex containing 0.5 to 40 parts by weight of said polymeric modifier for each 100 parts by weight of the vinyl chloride polymer is added to the slurry of the vinyl chloride polymer and coagulated therein, and the slurry of the vinyl chloride polymer containing the coagulated latex is agitated in the presence of 0.1 to 10% by weight, based on the weight of the vinyl chloride polymer, of an organic liquid that renders the surface of particles of the polymeric modifier tacky, and the slurry containing the coagulated latex is thereafter subjected to a filtration and drying process to separate the viny chloride polymer and said polymeric modifier from the aqueous medium to provide a polymer powder in which at least 75% by weight of said polymeric modifier is retained and at least 99% by weight of which powder will pass through a 52 mesh sieve (British Standard Fine Sieve Series).

As mentioned above one method of performing our invention involves the addition of the latex to the polymerisation vessel when the desired conversion has been attained.

During the suspension polymerisation of vinyl chloride at constant temperature, the pressure in the reaction vessel remains essentially constant until the reaction is nearing completion, at which stage the pressure starts to fall. In a convention suspension polymerisation process the excess of unreacted vinyl chloride in the polymerisation vessel is removed by venting to atmospheric pressure a short while after the pressure starts to fall. For example, the excess of monomer may be removed by venting when the pressure has fallen to a predetermined level. If monomeric vinyl chloride is used as the organic liquid, a convient way of performing the invention is by partially venting the polymerisation vessel after the pressure has started to drop or by allowing the pressure to drop to predetermined desired level for adding the latex and then introducing the polymer latex and the coagulant and then, after stirring, removing the remaining excess of vinyl chloride by venting to atmospheric pressure.

An alternative method of operating the process is to vent the polymerisation vessel to atmospheric pressure after the desired conversion has been achieved and then, with the slurry in the same or a different vessel, to introduce the latex of the polymeric modifier and coagulant to effect coagulation and then to add some fresh vinyl chloride or other organic liquid and, after agitating, filtering or centrifuging the vinyl chloride polymer and polymeric modifier from the aqueous medium.

After addition of the latex and coagulant, the mixture is agitated in the presence of an organic liquid. The period of this agitation can vary widely, from a matter of 2 minutes to 3 hours or more before removing any excess of the organic liquid, together with the aqueous phase.

The coagulant, which is preferably an electrolyte, may be added before or after the latex of the polymeric modifier. The organic liquid may be present during the latex addition and coagulation steps. Alternatively it may be added after coagulation or after addition of the latex and before addition of the coagulant. Where the coagulant is added before the latex, the organic liquid may be added after addition of the coagulant and before addition of the latex.

Organic liquids that may be used are those that render the surfaces of the polymeric modifier particles tacky. Such liquids are those that exert some solvent or swelling effect on the polymeric modifier or which are sticky liquids which merely provide a sticky coating on polymeric modifier particles. The organic liquids will also generally exert some solvent or swelling action on the vinyl chloride polymer particles thereby softening these to some extent. The organic liquids are preferably relatively volatile so as to assist removal from the polymer blend. Particularly suitable organic liquids are chlorinated hydrocarbons such as ethylene dichloride or chloroform, tetrahydrofurane, benzene, methyl methacrylate, vinyl acetate, and especially vinyl chloride. However, non-volatile organic liquids may also be used if they are desired in the final polymer blend. For example, in some cases a liquid plasticiser, stabiliser or lubricant for vinyl chloride polymers may be used as the organic liquid.

The amount of vinyl chloride or other organic liquid that is added should be from 0.1 to 10, preferably 0.5 to 7, parts per 100 parts by weight of the vinyl chloride polymer.

Where, however, the procedure used is to partially vent the polymerisation vessel and to use the residual vinyl chloride in the vessel as the organic liquid, the precise amount of vinyl chloride present is difficult to assess since it is present in three forms: in the gaseous state, dissolved in the water, and absorbed by the vinyl chloride polymer.

While the residual pressure in the polymerization vessel can be used as a convenient guide to ensure reproducible results, the actual pressure utilised will depend on a variety of factors including vessel dimensions, amount of water and vinyl chloride initially charged, polymerisation temperature and porosity of the polymer produced. However, the suitable pressure range to which the polymerisation vessel should be vented can be established by performing a few trial experiments, venting to different residual pressures. As a guide, in the systems used in the examples set out hereinafter, pressures of from 30 to 80 lbs. per square inch gauge (p.s.i.g.) were suitable.

The use of too much organic liquid, we believe, causes too much swelling and consequent agglomeration of the polymeric modifier particles, resulting in a coarse final polymer while too little organic liquid does not promote adequate adhesion between the polymeric modifier and the vinyl choride polymer and so polymeric modifier may often be lost during a drying process.

The polymeric modifier may be a resinous material or a rubbery material but must not contain more than 40% by weight of units derived from butadiene as polymers containing more than this amount of butadiene units agglomerate very readily in the presence of the organic liquid used to promote adhesion and give rise to coarse polymers. As stated hereinbefore suitable latices may be made by aqueous emulsion polymerisation processes wherein one or more monomers are emulsified with water with the aid of an emulsifying agent such as a water soluble metal salt of a sulphated or sulphonated long chain hydrocarbon, for example, sodium lauryl sulphate or sodium dodecyl benzene sulphonate, and are polymerised with the assistance of a free radical yielding initiator system such as potassium persulphate or the redox system of ammonium persulphate and sodium metabisulphite.

Examples of resinous polymeric modifiers that may be prepared by such a process and used in the process of our invention include polystyrene, styrene/acrylonitrile copolymers, polymethyl methacrylate and copolymers of methyl methacrylate with minor amounts, for example, up to 25% by weight, of monomers such as alkyl acrylates, for example, ethyl acrylate, or N-aryl maleimides, for example N-ortho chlorophenyl maleimide. Methylmethacrylate/N-aryl maleimide copolymers are described in our United Kingdom patent specification No. 1,026,912, the disclosure of which is hereby incorporated.

Examples of rubbery polymeric materials that may be prepared in latex form and used in the process of our invention include copolymers of ethylene with vinyl acetate, vinyl chloride, ethyl acrylate and methyl methacrylate; copolymers of butadiene with one or more monomers selected from styrene, acrylonitrile, methyl methacrylate, and ethyl acrylate; polyalkyl acrylates such as polyethyl acrylate and polybutyl acrylate; and graft copolymers of monomers such as (a) methyl methacrylate alone or in admixture with ethyl acrylate, or (b) a mixture of styrene and acrylonitrile, grafted on to a trunk of a butadiene copolymer such as a butadiene/styrene or a butadiene/methyl methacrylate copolymer. As mentioned hereinbefore, butadiene polymers and graft copolymers based thereon, must not contain more than 40% by weight of butadiene units.

The amount of polymeric modifier used may be from 0.5 to 40 parts by weight per 100 parts by weight of the vinyl chloride polymer. The precise amount will of course depend on the properties desired of the final composition and the nature of the polymeric modifier. When using resinous polymeric modifiers to donate improved processability to the composition, for example polystyrene, styrene/acrylonitrile copolymers, polymethyl methacrylate and methyl methacrylate/alkyl acrylate copolymers, the quantity required is generally relatively small, of the order of 0.5 to 15 parts by weight per 100 parts by weight of the vinyl chloride polymer.

The precise amount will of course depend on the precise nature of the polymeric modifier, for example, on its chemical nature and its molecular weight. For example, the amount of a methyl methacrylate/ethyl acrylate copolymer required to give a given improvement in processability decreases as the molecular weight of the methyl methacrylate/ethyl acrylate copolymer increases as is discussed in our United Kingdom patent specification No. 981,116.

When using resinous modifiers of high softening point, such as the methyl methacrylate/N-aryl maleimide copolymers, in order to increase the softening point of the vinyl chloride polymer composition, the amount of polymeric modifier used may be from 1 to 35 parts by weight per 100 parts by weight of the vinyl chloride polymer.

Rubbery polymeric modifiers are generally used for the purposes of improving the impact strength of the composition. For this purpose, amounts of the order of 2 to 25 parts by weight per 100 parts by weight of vinyl chloride polymer may be used.

We have found that the use of a rubbery and/or resinous polymeric modifier containing units derived from an acrylic monomer such as acrylonitrile, an alkyl acrylate or, especially, an alkyl methacrylate, including the graft copolymers of monomers such as styrene/acrylonitrile mixtures, methyl methacrylate or methyl methacrylate/ethyl acrylate mixtures on to butadiene copolymers, are particularly suitable for incorporation according to the process of our invention. Our preferred resinous polymeric modifiers are copolymers of methyl methacrylate with 5 to 25% by weight of ethyl acrylate while our preferred rubbery polymeric modifiers are graft copolymers of a mixture of methyl methacrylate and ethyl acrylate containing 5 to 15% by weight of ethyl acrylate on to a trunk of a butadiene copolymer obtained by polymerising a mixture of butadiene and (i) methyl methacrylate and/or (ii) styrene containing 50 to 85% by weight of butadiene, said graft copolymer containing from 30 to 70% by weight of said butadiene copolymer and less than 40% by weight of butadiene units.

As will be well appreciated, more than one latex may be used in the process of our invention. Thus a latex of a rubbery polymer and a latex of a resinous polymer, or latices of two rubbery polymers and/or one or more resinous polymers, or vice versa may be coagulated on to the vinyl chloride polymer slurry. The latices may be coagulated successively or may be mixed together and coagulated at the same time.

Indeed, in some cases it may be desirable to coagulate a small amount of a resinous polymer latex after a rubber polymer latex has been coagulated in order to obtain a product in the form of a free flowing powder. A successive coagulation process of this type is described in Dutch patent application No. 6700053 (corresponding to United Kingdom patent application 573,366/67). In such a case the resinous polymer may be a vinyl chloride polymer latex.

The solids content of the latices used in the process of our invention is not critical and may have any convenient value.

The coagulation step is preferably performed at a temperature within the range 40 to 80° C.

Electrolytes that may be used to effect coagulation include any water soluble, preferably polyvalent, metal salts, and in particular salts of calcium or aluminium. The electrolyte is preferably one whose residues, should they be retained in the polymer blend, will not adversely affect the properties of the blend. Calcium formate is a particularly preferred electrolyte.

The process of the invention may be applied to any vinyl chloride polymers prepared by a suspension polymerization process. Thus vinyl chloride can be homopolymerised or vinyl chloride may be copolymerised with a minor amount of one or more ethylenically unsaturated monomers such as vinyl acetate, vinyl ethers, vinylidene chloride, alkyl acrylates, and olefins such as ethylene or propylene. Preferably the monomer mixture contains at least 80% by weight of vinyl chloride.

The polymerisation may be carried out using any of the monomer soluble free radical yielding initiators such as the diacyl peroxides, for example, isobutyryl, lauroyl or benzoyl peroxides, azo compounds, for example, $\alpha,\alpha'$-azodiisobutyronitrile, or dialkyl peroxydicarbonates, for example, diethyl- or diisopropyl-peroxydicarbonate.

Examples of dispersing or granulating agents that may be used include water soluble colloids such as hydrolysed polyvinyl acetate, polyethylene oxide and hydroxy methyl cellulose.

The polymerisation may be effected at temperatures within the range of 30 to 80° C., the precise temperature used depending on the desired properties, particularly molecular weight, for example, as indicated by the Fikentscher K-value.

Other ingredients of the composition, such as pigments, stabilisers, lubricants and plasticisers may be incorporated, if desired, into the composition at any suitable stage. For example, they can be added to the aqueous medium before or during the polymerisation reaction or they may be added to the aqueous medium after polymerisation but before separation of the aqueous medium from the polymer, or compounded with the polymer blend in the normal manner.

Compositions made by the process of the present invention are particularly useful in unplasticised or rigid applications, i.e. in applications where the composition contains little or no plasticiser, for example, up to 5 parts by weight per 100 parts by weight of the vinyl chloride polymer, since the benefits of adding polymeric modifiers are most marked in such compositions. The compositions may be used for the manufacture of articles such as, for example, bottles, tube, rod, guttering, calendered foil, sheet and various injection moulded articles such as pipe fittings.

The invention is illustrated by the following examples in which all parts and percentages are expressed by weight. (Examples 1, 3, 4, 11, 13 and 18 are by way of comparison.)

EXAMPLE 1

66 litres of distilled water, 57.5 gm. of partially hydrolysed polyvinyl acetate and 16.4 gm. of diisopropyl peroxydicarbonate were charged to a stainless steel autoclave of capacity 161 litres fitted with a stirrer. 4100 gm. of an aqueous latex containing 30% by weight of a copolymer of 90 parts of methyl methacrylate and 10 parts of ethyl acrylate were then charged to the autoclave. The autoclave was evacuated, purged with nitrogen and re-evacuated and then 31 kg. of monomeric vinyl chlorine were added. The autoclave contents, while being continuously agitated, were heated to 65° C. to effect polymerisation.

The resulting polymer was unacceptably coarse, 65% of the polymer particles being retained on a 52 mesh sieve (British Standard Fine Sieve Series). For an acceptable material, the amount of polymer particles retained on a BS 52 mesh sieve must be not more than 1%.

When 615, 1250 and 2500 gm. of the latex were used in place of the 4100 gm., the resulting polymers were also unacceptably coarse, having retentions of 42, 62 and 63% respectively on a BS 52 mesh sieve.

Similarly when 4100 gm. of the latex were added when the autoclave pressure had dropped to 90 p.s.i.g. instead of at the start of polymerisation, a coarse material having a BS 52 mesh sieve retention of 30% was obtained.

EXAMPLE 2

The polymerisation process set out in Example 1 was repeated but omitting the latex of the methyl methacrylate copolymer from the autoclave charge. When the autoclave pressure had fallen to 90 p.s.i.g. the autoclave was partially vented to a pressure of 50 p.s.i.g. An aqueous solution containing 146 gm. of calcium formate as a coagulant was then added to the autoclave followed by 11 kg. of the latex used in Example 1. The mixture was stirred for 30 minutes at the temperature of 65° C. and then the residual vinyl chloride was vented off. The resultant slurry settled quickly and on filtration a clear filtrate was obtained. The polymer was dried to give a homogeneous free flowing powder in which 98% of the methyl methacrylate polymer was retained. The particle size distribution of the polymer powder was measured and gave the following results:

| BS Sieve No. | Percent of powder retained on sieve |
| --- | --- |
| 52 | 0 |
| 72 | 0.5 |
| 100 | 16.5 |
| 150 | 46.4 |
| 200 | 26.8 |

9.8% of the powder passed through the 200 mesh sieve.

EXAMPLE 3

The polymerisation procedure of Example 2 was repeated and when the autoclave pressure had fallen to 90 p.s.i.g., the autoclave was vented to atmospheric pressure. 11 kg. of the latex used in Examples 1 and 2 was then added and the mixture stirred for a few minutes. While the slurry contained about 8% of methyl methacrylate copolymer, based on the vinyl chloride polymer content, on filtration, a cloudy filtrate was obtained containing most of the methyl methacrylate copolymer. The filtered vinyl chloride polymer only contained about 2% of methyl methacrylate copolymer.

EXAMPLE 4

Example 2 was repeated but venting the autoclave to atmospheric pressure before adding the coagulant solution and the latex. The resultant slurry settled quickly and gave a clear supernatant liquid. However, on drying the wet solid residue in a pneumatic conveying drier wherein the wet polymer is blown through a tube by a relatively high velocity stream of heated air, much of the methyl methacrylate copolymer was lost by becoming entrained in the drier exhaust air stream, to give a polymer powder having a methyl methacrylate copolymer content of only about 2%.

The foregoing examples illustrate that unless the polymeric modifier is agitated in the presence of a solvent such as vinyl chloride after coagulation, the polymeric modifier is not sufficiently well bonded to the vinyl chloride polymer, but if the polymeric modifier is added before the polymerisation reaction is substantially completed, the particle size of the polymer is adversely affected.

EXAMPLE 5

A portion of the latex of the methyl methacrylate copolymer used in the previous examples was dried and 10 parts of the resulting solid methyl methacrylate copolymer were mechanically mixed with 100 parts of a solid granular vinyl chloride homopolymer made using the same polymerisation conditions used in the previous examples in a Henschel mixer. Stabilisers and lubricants were added to give a powder blend (A) suitable for the production of transparent articles.

A similar powder blend (B) was made by mixing the same stabilisers and lubricants with the polymer blends made in Example 2. The two powder blends were injection moulded to form transparent discs. The discs made from blend (A) contained specks of undispersed methyl methacrylate copolymer whereas those made from blend (B) were quite clear.

EXAMPLE 6

Example 4 was repeated but, after addition of the coagulant and latex of the methyl methacrylate copolymer, 410 gm. of vinyl chloride was injected and the mixture stirred at 65° C. for 30 minutes. The resulting slurry settled quickly and gave a clear filtrate. On drying a homogeneous free flowing powder was obtained in which about 95% of the methyl methacrylate copolymer was retained.

Similar results were obtained when the original charge of 41 kg. of vinyl chloride was replaced by 39 kg. of vinyl chloride and 2 kg. of propylene so as to make a vinyl chloride/propylene copolymer.

EXAMPLE 7

Example 2 was repeated but using 2.75 kg., 4.1 kg., 6.6 kg., 13.5 kg. and 20.5 kg. of the latex of the methyl methacrylate copolymer, and, correspondingly, coagulant solutions containing 136, 138, 141, 150 and 160 gm. of calcium formate. In all cases, after filtration and drying a homogeneous free flowing powder was obtained in which the methyl methacrylate copolymer retention was in the range 95-98%.

EXAMPLE 8

Example 2 was repeated but performing the polymerisation and coagulation stages at 50, 57, 62 and 71° C.

In all cases, after filtration and drying, a homogeneous free flowing powder was obtained in which the methyl methacrylate copolymer retention was in the range 95–98%.

EXAMPLE 9

Example 2 was repeated but venting the autoclave to different pressures before adding the coagulant and latex. The pressures used were 15, 30, 40, 60, 70, 80 and 90 p.s.i.g. The products obtained using pressures of 40, 60, 70 and 80 p.s.i.g. were all similar to that obtained in Example 2. However, at a pressure of 90 p.s.i.g. the product was unacceptably coarse. At a pressure of 30 p.s.i.g. the slurry settled quickly but giving a slightly cloudy supernatant liquid and filtrate. On drying a vinyl chloride polymer composition was obtained retaining about 80% of the methyl methacrylate copolymer. On the other hand, at a pressure of 15 p.s.i.g., most of the methyl methacrylate copolymer was lost on drying, giving a polymer composition having only a 20% retention of the methyl methacrylate copolymer.

EXAMPLE 10

Example 6 was repeated but injecting 205, 820, 3280 and 4100 gm. of vinyl chloride instead of 410 gm. When 4100 gm. of vinyl chloride was used, the product was unacceptably coarse but the use of 205, 820 and 3280 gm. of vinyl chloride gave results similar to the use of 410 gm. of vinyl chloride.

EXAMPLE 11

The polymerisation procedure of Example 1 was repeated but at a temperature of 57° C. In place of the latex of the methyl methacrylate copolymer, there was used 8.2 kg. of a latex containing 40% of a rubbery graft copolymer obtained by graft polymerising, by an aqueous emulsion polymerisation process, 50 parts of a mixture containing 90% of methyl methacrylate and 10% of ethyl acrylate onto a latex containing 50 parts of a rubbery copolymer of butadiene and styrene containing 66% butadiene and 34% styrene. After being held at the temperature of 57° C., no drop of pressure in the autoclave occurred even after 24 hours, indicating that the polymerisation reaction was severely retarded by the graft copolymer latex.

EXAMPLE 12

The procedure of Example 2 was repeated but using a polymerisation temperature of 57° C. When the autoclave pressure had dropped to 90 p.s.i.g. the autoclave was partially vented to a pressure of 45 p.s.i.g. An aqueous solution containing 142 gm. of calcium formate as a coagulant was then added to the autoclave, followed by 8.2 kg. of the latex of the rubbery graft copolymer used in Example 11. The mixture was stirred at 57° C. for 30 minutes. The slurry thus obtained settled fairly quickly although less rapidly than a normal vinyl chloride homopolymer slurry or the slurry of Example 2, and gave an almost clear filtrate.

On drying a homogeneous free flowing powder having a 93% retention of the rubbery graft copolymer was obtained. The particle size distribution of the polymer powder was measured and gave the following results:

| BS Sieve No.: | Percent of powder retained on sieve |
|---|---|
| 52 | 0 |
| 72 | 0.8 |
| 100 | 41.3 |
| 150 | 40.6 |
| 200 | 13.9 |

The percentage of powder passing through the 200 mesh sieve was 3.4%.

This composition was compounded with lubricants and stabilisers and extruded to form pipe. Likewise 100 parts of a vinyl chloride homopolymer made under the same polymerisation conditions at 57° C. was compounded with the same lubricants/stabilisers formulation and with 8 parts of the solid rubbery graft copolymer obtained by drying the latex, and extruded to form pipe. The composition made according to the present invention gave a pipe of greater impact strength (Charpy impact strength at 24° C. 8.5 ft. lb., Horsley falling weight impact strength at 0° C. 230 ft. lb.) than that of pipe made from the mechanical mixture of the vinyl chloride polymer and solid rubbery graft copolymer (Charpy impact strength at 24° C. 5.6 ft. lb., Horsley falling weight impact strength at 0° C. 160 ft. lb.).

EXAMPLE 13

The polymerisation procedure of Example 12 was repeated but using a temperature of 65° C. and venting the autoclave to atmospheric pressure when the autoclave pressure had dropped to 90 p.s.i.g. After venting, the coagulant solution containing 151 gm. of calcium formate and 15.6 kg. of the latex of the rubbery graft copolymer were added. After stirring for 30 minutes a thick cream was obtained that was difficult to stir and could not be handled nor filtered readily. On filtration over 50% of the rubbery copolymer was lost.

Similar results were obtained using 8.2 kg. of the latex of the graft copolymer and correspondingly a coagulant solution containing 142 gm. of calcium formate.

EXAMPLE 14

Example 13 was repeated but after polymerisation at 57° C. the temperature was raised to 65° C. and then 8.2 kg. of the latex and a coagulant solution containing 142 gm. of calcium formate were added. After the addition of the latex 2800 gm. of vinyl chloride were injected and the mixture was stirred for 30 minutes.

The resulting slurry settled fairly quickly and gave an almost clear filtrate. On drying a homogeneous free flowing polymer retaining substantially all of the graft copolymer was obtained. Similar results were obtained injecting 410 gm., 820 gm., and 2050 gm. of vinyl chloride. When 4100 gm. of vinyl chloride were used the product was slightly coarse, but just acceptable, 0.5% being retained on the 52 mesh sieve.

EXAMPLE 15

Example 12 was repeated but venting the autoclave to pressures of 30, 40, 60 and 90 p.s.i.g. before injecting the coagulant and latex. At a pressure of 90 p.s.i.g. a coarse product was obtained while at a pressure of 30 p.s.i.g. a cloudy filtrate occurred but the solid product retained most of the graft copolymer on drying. At the pressure of 40 and 60 p.s.i.g., products similar to that of Example 12 were obtained.

EXAMPLE 16

Example 12 was repeated but using polymerisation and coagulation temperatures of 50, 65 and 71° C. In each case the product was similar to that of Example 12.

EXAMPLE 17

Example 12 was repeated, obtaining similar results, using 10.25 kg. and 15.6 kg. of the latex, and correspondingly a coagulant solution containing 144 gm. and 158 gm. of calcium formate.

EXAMPLE 18

Example 13 was repeated using 15.6 kg. of the latex, but after venting, the slurry was heated to 85° C. before addition of the coagulant which contained 158 gm. of calcium formate and latex. The resulting homogeneous slurry settled quickly and gave a clear supernatant liquid. However, on cooling the slurry, breakdown and emulsification of the rubber coagulum occurred and on drying 50% of the rubber was lost.

EXAMPLE 19

The procedure of Example 2 was repeated but using a mixture of 39.8 kg. of vinyl chloride and 1.2 kg. of vinyl acetate in order to obtain a vinyl chloride/vinyl acetate copolymer, 1.68 kg. of the latex of the methyl methacrylate copolymer were incorporated by the method used in Example 2 using a coagulant solution containing 133 gm. of calcium formate.

The product was a homogeneous free flowing powder in which all the methyl methacrylate polymer was retained.

Similar results were obtained using 33 kg. of vinyl chloride and 8 kg. of vinyl acetate.

EXAMPLE 20

108 litres of distilled water, 77 gm. of partially hydrolysed polyvinyl acetate and 15.3 gm. of diisopropyl peroxydicarbonate were charged to a stainless steel autoclave of capacity 275 litres fitted with a stirrer. The autoclave was evacuated, purged with nitrogen, and reevacuated and then 55 kg. of monomeric vinyl chloride were added. The autoclave contents, while being continuously agitated, were heated to 65° C. to effect polymerisation. When the autoclave pressure had dropped to 90 p.s.i.g. the residual vinyl chloride was vented off. 240 gm. of calcium formate was then added and the autoclave contents stirred for a further 10 minutes then 16.9 litres of the latex used in Example 1 was added. The autoclave contents were stirred for another 30 minutes and then 253 gm. (about 0.5 part per 100 parts of vinyl chloride polymer) of a commercially available grade of glyceryl monooleate of melting point $-4°$ C. (which is a sticky liquid lubricant often used in vinyl chloride polymer compositions) was added and the autoclave contents stirred for a further 30 minutes before cooling.

The resulting slurry settled to give a clear supernatant liquid. The slurry was pumped to a filter where it was filtered, washed and dried to give a homogeneous free flowing powder in which about 85% of the methyl methacrylate/ethyl acrylate copolymer was retained.

By way of comparison a repeat of this process but omitting the addition of the glyceryl monooleate gave a slurry which broke down on pumping to the filter, resulting in the loss of about 75% of the methyl methacrylate/ethyl acrylate copolymer.

EXAMPLE 21

Example 12 was repeated but using different rubbery graft copolymers and venting the autoclave to a variety of pressures. The results are set out in the following table:

| Rubber | Butadiene content, percent of graft | Autoclave pressure (p.s.i.g.) when coagulant and latex were added | Result |
| --- | --- | --- | --- |
| 50 parts of MMA/EA grafted on to 50 parts of Bu/St copolymer of Bu content 62%. | 31 | 45<br>60<br>0 | Homogeneous free flowing powder.<br>Do.<br>Slurry was a thick cream. On filtration over 50% of rubbery graft polymer was lost. |
| 40 parts of MMA/EA grafted on to 60 parts of Bu/St copolymer of Bu content 62%. | 37 | 45<br>60<br>0 | Homogeneous free flowing powder.<br>Do.<br>Slurry difficult to handle. 70% of rubbery graft polymer was lost on filtration. |
| 30 parts of MMA/EA grafted on to 70 parts of Bu/St copolymer of Bu content 62%. | 43 | 60<br>0 | Unacceptably coarse product.<br>Homogeneous free flowing powder. |
| 20 parts of MMA/EA grafted on to 80 parts of Bu/St copolymer of Bu content 62%. | 50 | 60<br>0 | Unacceptably coarse product.<br>Homogeneous free flowing powder. |

NOTE.—MMA=methyl methacrylate; EA=ethyl acrylate; Bu=butadiene; St=styrene. In all cases the methyl methacrylate/ethyl acrylate ratio was 90:10.

In all cases the rubbery graft copolymer latex had a solids content of 40% and 8.2 kg. of the latex was added.

Surprisingly it is seen that while the process of the present invention is necessary for satisfactory incorporation of the polymeric modifier for the rubbery graft copolymers containing less than 40% of butadiene, the process of the invention is in fact detrimental to the product when using rubbers having a butadiene content of over 40%.

We claim:

1. In a process for the manufacture of blends of a vinyl chloride polymer and another polymeric modifier, in which a monomeric material selected from vinyl chloride and mixtures of vinyl chloride and at least one copolymerizable monomer, said mixture containing at least 80% by weight of vinyl chloride, is polymerized in aqueous suspension in a reaction vessel to produce a slurry of vinyl chloride polymer particles which particles can be separated from said slurry by filtering or centrifuging, and, after the desired conversion of the monomeric material to polymer has been achieved, an aqueous latex containing 0.5 to 40 parts by weight of said polymeric modifier for each 100 parts by weight of the vinyl chloride polymer is added to the slurry of the vinyl chloride polymer particles and coagulated therein, and the slurry containing the coagulated latex is thereafter subjected to a filtration and drying process to separate the vinyl chloride polymer and said polymeric modifier from the aqueous medium, to provide a polymer powder;

the improvement wherein the slurry of vinyl chloride polymer particles containing the coagulated latex is agitated and, during the agitation there is present in such aqueous latex 0.1 to 10% by weight, based on the weight of said vinyl chloride polymer, of an organic liquid that exerts a solvent or swelling action on the vinyl chloride polymer particles and therefore renders the surfaces of the vinyl chloride polymer particles tacky, the organic liquid being selected from the group consisting of ethylene dichloride, chloro-, form, tetrahydrofuran, benzene, methyl methacrylate, vinyl acetate and vinyl chloride, said polymer powder retaining at least 75% by weight of said polymer modifier and at least 99% by weight of said powder being capable of passing through a 52 mesh sieve (British Standard Fine Sieve Series).

2. A process as claimed in claim 1 in which the organic liquid is vinyl chloride.

3. A process as claimed in claim 2 in which, after the desired conversion of the monomeric material to polymer has been achieved, the residual vinyl chloride in the reaction vessel is vented off until from 0.1 to 10% by weight of vinyl chloride remains, based on the weight of the vinyl chloride polymer, and then the latex is added to the reaction vessel and coagulated therein.

4. A process as claimed in claim 1 in which, after the desired conversion of the monomeric material of polymer has been achieved, the residual vinyl chloride in the reaction vessel is removed, and the organic liquid is added after removal of said residual vinyl chloride.

5. A process as claimed in claim 1 in which the amount of organic liquid used is from 0.5 to 7% by weight, based on the weight of the vinyl chloride polymer.

6. A process as claimed in claim 1 in which the coagulation is effected at a temperature in the range 40 to 80° C.

7. A process as claimed in claim 1 in which coagulation is effected by the addition of calcium formate as a coagulant.

8. A process as claimed in claim 1 in which the coagulated latex is agitated in the presence of the organic liquid for a period of time within the range 2 minutes to 3 hours.

9. A process as claimed in claim 8 in which the coagulated latex is agitated in the presence of the organic liquid for a period of time within the range 5 minutes to 1 hour.

10. A process as claimed in claim 1 in which the polymeric modifier is selected from polystyrene, styrene/acrylonitrile copolymers, polymethyl methacrylate and copolymers of methyl methacrylate with up to 25% by weight of an alkyl acrylate.

11. A process as claimed in claim 10 in which the polymeric modifier is a copolymer of methyl methacrylate with from 5 to 25% by weight of ethyl acrylate.

12. A process as claimed in claim 10 in which from 0.5 to 15 parts by weight of the polymeric modifier is added for each 100 parts by weight of the vinyl chloride polymer.

13. A process as claimed in claim 1 in which the polymeric modifier is a copolymer of methyl methacrylate with up to 25% by weight of an N-aryl maleimide.

14. A process as claimed in claim 13 in which from 1 to 35 parts by weight of the polymeric modifier is added for each 100 parts by weight of the vinyl chloride polymer.

15. A process as claimed in claim 1 in which the polymeric modifier is a rubber.

16. A process as claimed in claim 15 in which from 2 to 25 parts by weight of the polymeric modifier are added for each 100 parts by weight of vinyl chloride polymer.

17. A process as claimed in claim 15 in which the rubber is a graft copolymer of a mixture of methyl methacrylate and ethyl acrylate containing 5 to 15% by weight of ethyl acrylate on a trunk of a butadiene copolymer obtained by polymerising a mixture of butadiene and a monomeric material selected from methyl methacrylate, styrene and mixtures of methyl methacrylate and styrene, said mixture of butadiene and monomeric material containing 50 to 85% by weight of butadiene, and said graft copolymer containing from 30 to 70% by weight of said butadiene copolymer and less than 40% by weight of butadiene units.

References Cited

UNITED STATES PATENTS

| | | | |
|---|---|---|---|
| 2,791,600 | 5/1957 | Schwaegerle | 260—899 X |
| 3,053,800 | 9/1962 | Grabowski et al. | 260—876 X |
| 3,264,373 | 8/1966 | Whitworth et al. | 260—876 |
| 3,085,082 | 4/1963 | Baer et al. | 260—897 X |
| 3,022,263 | 2/1962 | Orthner et al. | 260—897 X |

FOREIGN PATENTS

| | | | |
|---|---|---|---|
| 586,973 | 4/1947 | Great Britain | 260—29.7 |

JOHN C. BLEUTGE, Primary Examiner

U.S. Cl. X.R.

260—29.6 RU, 29.7 U, 30.4 R, 31.2 R, 33.6 UA, 34.2, 876, 890, 897 C, 898, 899